United States Patent Office.

JOHN GAMGEE, OF BAYSWATER, ENGLAND, AND ARTHUR GAMGEE, OF EDINBURGH, SCOTLAND.

*Letters Patent No. 71,377, dated November 26, 1867.*

IMPROVEMENT IN PRESERVING ANIMAL AND VEGETABLE SUBSTANCES.

The Schedule referred to in these Letters Patent and making part of the same.

*To whom it may concern:*

Be it known that we, JOHN GAMGEE, of Bayswater, in county of Middlesex, England, and ARTHUR GAMGEE, M. D., of Edinburgh, Scotland, have invented certain new and useful Improvements in Slaughtering Animals, with a view to the preservation of their bodies as articles of food, &c.; and we hereby declare the following to be a full, clear, and exact description of the same.

This invention relates to a new and improved method of slaughtering animals that are destined for human food, with a view to the preservation of their bodies for future use, as such food, and also to a new method of preserving animal and vegetable substances from decay.

The animals whose flesh is to be preserved are, when this is possible, killed by causing them to inhale carbonic-oxide gas, which may be generated by the action of heat on a mixture of sulphuric and oxalic acids, or of sulphuric acid and ferrocyanide of potassium, or by any other method which yields carbonic-oxide gas. The animals are then bled and dressed in the usual way, and the flesh may then be sold as human food; and, even if it has travelled any distance, it will retain a fresh and bright appearance longer than ordinary-killed meat.

The flesh of animals slaughtered with the aid of carbonic-oxide gas, or of animals slaughtered in the usual way, may further be preserved as follows:

First, by being placed in a closed chamber or vessel containing carbonic-oxide gas alone, or a mixture of carbonic oxide and air, or other gas or vapor, for a period varying from two to twenty-four hours, with a view to a complete action on the meat and its juices.

Secondly, by simple fumigation of the entire carcass, or portions of the carcass, after the action of carbonic oxide, by means of sulphurous-acid gas alone, or in combination with hydrochloric-acid gas.

Thirdly, the flesh to be preserved may be placed in an air-tight vessel, of iron, tin, or other material, and provided with two tubes, whereby the atmospheric air may be withdrawn by means of an air-pump, or other sufficient means for securing a vacuum. Having thus exhausted the vessel, we allow pure carbonic oxide to flow into the vessel, and then add sulphurous-acid gas, in the proportion of about twenty to thirty cubic inches to each pound of meat to be preserved. Having thus secured that nothing but carbonic-oxide and sulphurous-acid gases surround the meat, the vessel is hermetically closed, by squeezing and soldering the tubes above mentioned.

Fourthly, the acid gas or gases and vapors used as antiseptics, in conjunction with carbonic-oxide gas, may be introduced into the air-tight vessel at the time the meat is placed in it, by causing such gas or gases to be absorbed by charcoal.

When charcoal, saturated with pure sulphurous acid, is used, it is employed in the proportion of from two to four ounces for every ten pounds of meat, and, in the event of the meat having been previously acted upon by carbonic-oxide gas, other gases, such as nitrogen or carbonic-acid, may be used to fill the vessels before closing.

Claims.

1. The use of carbonic oxide in the process of preserving animals whose flesh is to be used as human food, whether by causing animals to inhale carbonic-oxide gas as they die, or by placing the meat in chambers or vessels containing carbonic oxide alone, or in conjunction with other gases or vapors.

2. The use of charcoal, saturated with sulphurous acid or other antiseptics, in conjunction with carbonic-oxide and other gases or vapors, for the preservation of animal substances.

In witness whereof, we have signed our names to this specification, in the presence of two subscribing witnesses.

JOHN GAMGEE.
ARTHUR GAMGEE, M. D.

Witnesses to signature of said JOHN GAMGEE:
   J. WM. JOHNSON,
   J. JOHN VIDLER.

Witnesses to signature of said ARTHUR GAMGEE:
   WILLIAM SHEARER,
   ANDREW CARNOCHAN.